US000001975H

(19) United States

(12) Statutory Invention Registration (10) Reg. No.: US H1975 H

Rosendale et al. (43) Published: Jul. 3, 2001

(54) THERMOPLASTIC ARTICLE HAVING A METALLIC FLAKE APPEARANCE

(75) Inventors: David Rosendale, Mt. Vernon, IN (US); John G. Skabardonis, Mt. Pleasant, SC (US)

(73) Assignee: General Electric Co., Pittsfield, MA (US)

(21) Appl. No.: 09/401,233

(22) Filed: Sep. 23, 1999

(51) Int. Cl.[7] ..... C09D 5/29

(52) U.S. Cl. ..... 523/171; 523/217

(58) Field of Search ..... 523/171, 217

(56) References Cited

U.S. PATENT DOCUMENTS

| | | | | |
|---|---|---|---|---|
| 5,025,081 | | 6/1991 | Fontana et al. . | |
| 5,364,926 | | 11/1994 | Sakashita et al. . | |
| 5,629,367 | * | 5/1997 | Lofftus et al. | 524/88 |
| 5,753,371 | | 5/1998 | Sullivan et al. . | |
| 5,824,144 | | 10/1998 | He et al. . | |

FOREIGN PATENT DOCUMENTS

| | | |
|---|---|---|
| 4-27932 B2 | 5/1992 | (JP) . |
| 4-55462 | 9/1992 | (JP) . |
| 6-99592 | 12/1994 | (JP) . |
| 6-99593 | 12/1994 | (JP) . |

OTHER PUBLICATIONS

BYK Gardner Haze–Gard Plus Instrument Manual, Cat. No. 4725, Jun. 1996.

*Mearl Pigments Product Specifications & Properties, Experimental Product EP 97079*, Engelhard Corporation, Oct. 28, 1998.

Additives: Producing Three–Color Effects From Interference Pigments, Louis Armanini, The Mearl Corporation, Ossining, New York, *Plastics Engineering*, pp. 31–33, Dec. 1994.

*Encyclopedia of Polymer Science and Engineering*, John Willey & Sons, vol. 11 pp. 651–655, 1988.

ASTM Procedure D1003–97, *Standard Test Method for Haze and Luminous Transmittance of Transparent Plastics*, pp. 199–204.

* cited by examiner

*Primary Examiner*—Harold J. Tudor

(74) *Attorney, Agent, or Firm*—Frank A. Smith

(57) ABSTRACT

The transparent articles described herein have interspersed small particles with a metallic glint. This appearance is achieved by dispersing metal oxide-coated glass platelets within a thermoplastic matrix. It is desirable to take steps to avoid breaking the glass platelets during the process of preparing these materials.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMOPLASTIC ARTICLE HAVING A METALLIC FLAKE APPEARANCE

CROSS REFERENCE TO RELATED PATENTS

None

STATEMENT REGARDING FEDERALLY SPONSORED RESEARCH

Not applicable.

BACKGROUND OF THE INVENTION

This application relates to a transparent article having a metallic flake appearance. Specifically, this application relates to an article that comprises a pigment having a metallic flake appearance dispersed within a transparent thermoplastic matrix.

As thermoplastics become increasingly important in the marketplace, producers have sought to differentiate their products by making them more visually exciting to the customer. One desirable look for thermoplastics is the metal flake appearance. This appearance can be described as the look one could imagine if small pieces of metal were dispersed in molten glass, and the glass was subsequently cooled. The flakes have a metallic glint, but one perceives clear spaces between the metallic flakes such that portions of the article are completely transparent.

Until now, it has been very difficult to produce a thermoplastic article having a metal flake appearance. Metal flakes, most typically aluminum flake, have been dispersed in thermoplastics to create a metal flake appearance, but there are several disadvantages to this method. Specifically, the metal flakes tend to cause degradation of the polymer, which leads to a loss in mechanical properties. For instance, dispersing aluminum flake in polycarbonate will significantly decrease the impact strength of the polycarbonate. Moreover, aluminum flake is hazardous because it can cause dust explosions. If aluminum flake does burn in a fire, it burns at a very high temperature, which makes the fire very difficult to extinguish.

Mica has also been dispersed in thermoplastics in an attempt to create a metallic flake appearance. Mica can provide a metallic flake appearance, especially when coated with a layer of an inorganic pigment such as titanium dioxide. However, mica has several drawbacks. Specifically, incorporating mica in a transparent thermoplastic tends to decrease the transparency of the thermoplastic, producing a "milky" appearance. Mica also degrades the physical properties of the thermoplastic matrix. Finally, it is difficult to prepare materials containing mica platelets because excessive shear conditions may cause breakage of the platelets, which can ruin desired appearance.

The articles according to the present invention have a desirable metallic flake appearance, yet they avoid the above-identified problems with previous compositions having this same appearance.

SUMMARY OF THE INVENTION

The transparent articles disclosed herein have a metallic flake appearance. These articles are formed by dispersing an amount of metal oxide-coated glass platelets in a transparent thermoplastic matrix. The amount and size of platelets must be sufficient to create the metallic flake appearance, but not so high that the article appears opaque and metallic. The matrix must be transparent because the platelets have minimal affect on the appearance of opaque materials.

The method for making a transparent article disclosed herein comprises melt extruding a transparent polymer matrix together with an amount of metal oxide-coated glass platelets effective to provide a metallic flake appearance. It is important in this process to avoid excess shear because such treatment can cause physical damage to the platelets, which results in a chemical interaction that causes the transparent matrix to yellow.

DETAILED DESCRIPTION OF THE PREFERRED EMBODIMENTS

As used herein, the term "article" designates any and all items made from a thermoplastic, including thermoplastic compositions prior to molding (e.g., pellets) and molded, extruded, laminated, cast or otherwise processed items. Where the term articles designates pellets, the pellets may themselves have a rough surface, and therefore may not look transparent, but will be capable of forming transparent articles upon processing. Such pellets should still be considered to be transparent, as defined below.

As used herein, the term "transparent" means a transparent, natural or translucent article having a light transmittance above 50%. The transmittance is measured according to ASTM procedure D1003, using a BYK Gardner Hazeguard Plus instrument. The machine operates by measuring the intensity difference between the projected light and the transmitted light using a photodetector. A transparent article according to this definition may have reduced transmission, due to the inclusion of some other ingredients (e.g., dyes) but will still have light transmittance above 50%.

As used herein, the term "natural" refers to an article having a light transmittance above 80%. Such materials may actually contain small amounts of dyes designed to offset any other color which may be an undesirable artifact of the manufacturing process (e.g., yellowing), or to provide a specific color in combination with the metallic look.

The finished articles according to the invention have adequate transparency to produce the metallic flake appearance.

The transparent thermoplastic matrix described above may be any transparent thermoplastic material that is compatible with metal oxide-coated glass platelets. Suitable transparent thermoplastic materials include, but are not limited to polycarbonates, copolyester carbonates, polymethyl methacrylate, polyetherimides, transparent polyimides, halo olefin polymers, transparent polyamides (nylons), polyesters, transparent polycarbonate-polyester blends, polysulfones, polyether and polyphenyl sulfones, transparent acrylonitrile butadiene styrene, styrene acrylonitrile (SAN), polystyrene, cellulosics, miscible transparent polystyrene-polyphenylene oxide (PS-PPO) blends, acrylics, polycarbonate-polysiloxanes, polyetherimide-polysiloxanes, polyarylates, polyethylene terephthalate, and blends and copolymers of all of the above. More preferred transparent thermoplastic matrix materials are polyetherimides, polymethyl methacrylate, polycarbonate (homopolymer or copolymers), copolyester carbonates, polyethylene terephthalate (PET), styrene acrylonitrile, polystyrene, transparent acrylonitrile butadiene styrene and cellulosics. An even more preferred matrix material is a clear aromatic polycarbonate homopolymer based primarily on the bisphenol-A monomer. A most preferred embodiment of the invention is a copolyester carbonate made by reacting a dicarboxylic acid (e.g., dodecanedioic acid) with bisphenol-A monomer. Various methods for synthesizing these materials are well known in the art. For example, U.S. Pat. No. 5,364,926 describes the melt process for making polycarbonate, and is incorporated by reference herein. Moreover, the interfacial, melt and solid state methods for making polycarbonate are generally summarized in the Encyclopedia of Polymer Science and Engineering, John Wiley & Sons, Vol. 11, pp. 651–655 (1988).

Metal oxide-coated glass platelets are preferably made by first stretching a molten C glass into thin sheets, beads or glass tubes followed by crushing this glass into flakes. C glass is a form of glass that is resistant to corrosion by acid and moisture due to its zinc oxide content. Typically, these glass flakes are coated by dispersing them in water at a concentration of 10 to 20%. Next, an appropriate iron or titanium source is added while maintaining the pH at an appropriate level (e.g., by adding a base) to cause precipitation of hydrous titanium dioxide or hydrous iron oxide on the glass flake. Then an acid is typically added, the flakes are washed and subsequently calcined. Suitable metal oxide-coated glass platelets and methods for making them are described in U.S. Pat. No. 5,753,371, which is hereby incorporated by reference.

It is preferred to use platelet loadings of 0.005 to 5 percent by weight of the transparent polymer matrix. It is more preferred to use platelet loadings of 0.01 to 2 percent by weight. If the loading is too low, the metallic flake appearance will not be observable. If the loading is too high, the entire article will seem metallic, will not be transparent, and will have degraded physical properties (e.g., poor impact performance). The average particle size of the glass platelets is typically from 30 to 200 microns.

The transparent matrix may optionally further contain an optical brightening agent, a dye or dyes (which may be fluorescent), a light diffuser, stabilizers and/or antioxidants, pigments, antistatic agents, mold release agents and ultraviolet light ("UV") stabilizers. None of these additives should exceed an amount which will cause the matrix to become opaque.

Suitable optical brightening agents include, but are not limited to, aromatic stilbene derivatives, aromatic benzoxazole derivatives, or aromatic stilbene benzoxazole derivatives.

Any type of dye may be added which is compatible with the matrix and does not cause the matrix to become opaque. Examples of some fluorescent dyestuffs include Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation).

It may be desirable to add a light diffuser to the transparent polymer matrix. Adding a light diffuser will create a translucent matrix. Suitable light diffusers include, but are not limited to, polytetrafluoroethylene, zinc oxide, and polymethylmethacrylate. For example, Techpolymer MBX-series crosslinked polymethylmethacrylate microspheres, which are available in various diameters from Nagase America (e.g., 5–50 micron avg. diameter), may be added to the matrix.

It may also be advantageous to add stabilizers and antioxidants to the transparent thermoplastic matrix. Some examples of suitable stabilizers and antioxidants include phosphites (e.g., aromatic phosphite thermal stabilizers), metal salts of phosphoric and phosphorous acid, hindered phenol antioxidants, epoxides, aromatic lactone radical scavengers, and combinations thereof.

Any other type of pigment that is well known for inclusion in thermoplastic materials can also be added to the transparent polymer matrix, provided the amount of pigment added is sufficiently low to preserve transparency and metallic flake appearance of the article. Suitable pigments include titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide.

Suitable antistatic agents include, but are not limited to, phosphonium salts, polyalkylene glycols, sulfonium salts and alkyl and aryl ammonium salts.

Suitable mold release agents include, but are not limited to, pentaerythritol tetracarboxylate, glycerol monocarboxylate, glycerol triscarboxylate, polyolefins, alkyl waxes and amides.

Suitable UV stabilizers include, but are not limited to, substituted benzotriazoles, or triazines, or tetraalkylpiperidines. The UV stabilizers may be mixed into the thermoplastic matrix, or they can be included only in a "hardcoat" transparent protective layer which is applied over the viewing surface, or stabilizers can be included both in the matrix and the hardcoat.

The matrix may further comprise other resins and additives such as heat resisting agents, anti-weathering agents, lubricants, plasticizers, flame retardants, and flow-improving agents. Again, the transparency and the metallic flake appearance of the matrix are limiting factors in adding any of these materials. These additives may be introduced in a mixing or molding process.

To prepare the resin composition of the invention, the components may be mixed by any known methods. Typically, there are two distinct mixing steps: a premixing step and a melt mixing step. In the premixing step, the dry ingredients are mixed together. This premixing step is typically performed using a tumbler mixer or a ribbon blender. However, if desired, the premix may be manufactured using a high shear mixer such as a Henschel mixer or similar high intensity device. The premixing step must be followed by a melt mixing step where the premix is melted and mixed again as a melt.

Alternatively, it is possible to skip the premixing step, and simply add the raw materials directly into the feed section of a melt mixing device via separate feed systems. In the melt mixing step, the ingredients are typically melt kneaded in a single screw or twin screw extruder, a Banbury mixer, a two roll mill, or similar device.

It is preferred to skip the premixing step and introduce the platelets into the molten polymeric matrix downstream in an extruder after the point where the polymer melts. This process works better than feeding the platelets at room temperature into the mouth of the extruder. Feeding at room temperature is problematic because mixing the solid polymer matrix with the platelets and subsequently melting the polymer in an extruder subjects the platelets to high shearing forces, which tends to cause breakage of the platelets. It is undesirable to break apart the platelets because they may become too small to achieve the desired metallic flake appearance. Moreover, the broken platelets may undergo a chemical reaction with the matrix, which causes yellowing of the matrix. Feeding into the melt is also preferred because it helps eliminate dust problems associated with adding dry platelets to the mouth of the extruder.

In an alternate, preferred embodiment of the invention, the preferred method described above can be used to form "concentrate" pellets comprising platelets dispersed in the matrix wherein at a higher concentration than the finished pellets. These "concentrate" pellets are then fed into the feed section of a single or twin screw extruder together with additional matrix material (pellets or flake) to form finished pellets having a diluted concentration of the platelets. Alternatively, the concentrate pellets can be added to the extruder at a position down stream from the feed section.

The concentrate method eliminates the potential of contaminating nearby processes with raw glass flake. Also, the additional matrix material fed together with the concentrate pellets may be different from the matrix material in the concentrate pellets. However, the additional matrix material must be miscible with the matrix material used for the concentrate pellets such that the final pellets will be transparent.

Finished articles according to present invention may then be manufactured by molding the melt mixed material into various shapes using an injection molding machine or other known apparatus. Alternatively, a film can be formed on a substrate for example, by insert molding, in-mold decorating, laminating, co-injection or co-extrusion. Additionally, a film can be extruded onto sheet or another film, which can then be thermoformed, vacuum-formed, or shaped in some manner. All other known methods for creating multi-layer, or any other articles are also suitable.

The present invention is further described by way of the following examples. These examples are intended to be representative of the invention, and are not in any way intended to limit its scope.

EXAMPLE 1

A formulation consisting of 5 kg of a copolyester carbonate having a Melt Flow index of 11 (300C, 1.2 kg, ASTM D1238) was prepared by reacting dodecanedioic acid with bisphenol A and phosgene, as described in U.S. Pat. No. 5,025,081, which is incorporated by reference herein. Next, the 5 kg of resin powder, 13.5 g of mold release agent (pentaerythritol tetrastearate), and 3 g of tris (2,4-di-t-butylphenyl) phosphite were added to a container. 20 g of TiO2 coated glass flake, known commercially as Firemist Pearl sold by Engelhard Corporation, was added to this container. The container was sealed and mixed by shaking it in a paint shaker. The blended mixture was then compounded on a 2.5 inch single screw extruder and cut into pellets. After 4 hours drying at 220° F., the pellets were molded into various test specimens.

EXAMPLE 2

A formulation consisting of 5 kg of a polycarbonate having a Melt flow index of 14 was prepared by reacting bisphenol A with phosgene using the interfacial method. The resin, 13.5 g of mold release agent (pentaerythritol tetrastearate), and 3g of thermal stabilizer (tris (2,4-di-t-butylphenyl) phosphite) were mixed together with 20g of $TiO_2$ coated glass flake material, and pellets were prepared as described in Example 1.

EXAMPLE 3

A formulation was prepared as described in Example 2, with the exception that only 5 g of $TiO_2$ coated glass flake was added.

EXAMPLE 4

A formulation was prepared as described in Example 1, with the exception that only 5 g of $TiO_2$ coated glass flake was added.

COMPARATIVE EXAMPLE 5

A formulation was prepared as described in Example 1 with the exception that 20 g of pearlescent mica material, known commercially as Magnapearl 4000 sold by Engelhard Corporation, was added in place of the glass flake. Table I, below, shows a comparison of the properties observed upon measuring samples prepared in Examples 1–4 and in this comparative example.

TABLE I

| Ex # | Notched izod (RT*) | Notched izod (0 C.) | % Transmission | Clarity | Appearance |
|---|---|---|---|---|---|
| 1 | 13 | 6.9 | 72.8 | 80.7 | bright reflecting distinct flakes in polymer matrix. |
| 2 | 3.1 | — | — | — | same as #1 |
| 3 | 12.6 | 2.9 | — | — | same as #1 |
| 4 | 13.5 | 13.4 | 86.5 | 95.3 | same as #1 |
| 5 | 2.7 | — | 38.0 | 59.8 | Hazy, milky translucent |

*RT = room temperature

One can draw the several conclusions from the observed data. First, a comparison of Example 1 and 5 shows that mica imparts a different look to the article and adversely affects impact strength. Second, the deterioration in impact strength is a function of the loading of the $TiO_2$ coated glass flake. Third, the materials having a copolyester carbonate matrix perform are much more tolerant of high loadings of glass flake than polycarbonate homopolymers.

COMPARATIVE EXAMPLE 6

$TiO_2$ coated glass flake material was pulverized with a mortar and pestle and added to the ingredients in the manner of Example 1. The molded material made using the pulverized material was more yellow than that of Example 1. Specifically, the yellowness index (hereinafter "YI") (ASTM D1925) of the material with crushed flake showed a YI measurement 0.6 greater than the uncrushed flake. Also, the flakes in the polymer matrix had a duller appearance.

COMPARATIVE EXAMPLE 7

$TiO_2$ coated glass flake material was added, along with 100 g of titanium dioxide in the manner of Example 1 in order to produce an opaque white material. The presence of the flakes in the molded material was barely discernable visually.

COMPARATIVE EXAMPLES 8 AND 9

Two opaque samples, with and without $TiO_2$ coated flake, were prepared by mixing ingredients as summarized in Table II, below:

TABLE II

| Material | Comparative 8 | Comparative 9 |
|---|---|---|
| BPA Polycarbonate Power | 3,000 g. | 3,000 g. |
| Irgafos 168 | 1.8 g. | 1.8 g. |
| EP97079 White Glass Flake | 30 g. | — |
| Magna pearl 4000 | — | 30 g. |
| Carbon Black | 30 g. | 30 g. |

In Table II, the bisphenol A (BPA) polycarbonate powder was prepared by the interfacial process. the Irgafos 168 is a phosphite stabilizer having the following chemical formula:

tris-2,4 di-t-butylphenylphosphite. The EP 97079 white glass flake ("Firemist Pearl") is commercially available from Englehard. As mentioned previously, Magna pearl 4000 is a mica flake material which is also available from Englehard.

The room temperature notched izod tests showed that Comparative Example 2 had a value of 7.3, whereas Example 9 had a notched izod value of 3.9.

Because of the inclusion of carbon black, both of these formulations were opaque, and did not have a metallic flake appearance.

What is claimed is:

1. A transparent article having a metallic flake appearance, which article comprises an amount of metal oxide-coated glass platelets effective to provide a metallic flake appearance, wherein said platelets are dispersed within a transparent polymer matrix.

2. The transparent article according to claim 1, wherein the transparent polymer matrix further contains a dye or pigment.

3. The transparent article according to claim 1, wherein the transparent polymer matrix is natural.

4. The transparent article according to claim 1, wherein the transparent polymer matrix is polycarbonate with dispersed spheres of polymethyl methacrylate.

5. The transparent article according to claim 1, wherein the platelets are present in an amount of 0.01 to 2 percent by weight.

6. The transparent article according to claim 5, wherein the transparent polymer matrix is selected from the group consisting of polycarbonate homopolymers, polycarbonate copolymers, copolyester carbonates, polymethyl methacrylate, polyetherimides, transparent polyimides, halo olefin polymers, transparent polyamides, polyesters, transparent polycarbonate-polyester blends, polysulfones, polyether and polyphenyl sulfones, transparent acrylonitrile butadiene styrene, styrene acrylonitrile, polystyrene, cellulosics, miscible transparent polystyrene-polyphenylene oxide (PS-PPO) blends, acrylics, polycarbonate-polysiloxanes, polyetherimide-polysiloxanes, polyarylates, polyethylene terephthalate, and blends and copolymers of all of the above.

7. The transparent article according to claim 6, wherein the transparent polymer matrix is selected from the group consisting of polymethyl methacrylate, polycarbonate homopolymers, polycarbonate copolymers, copolyester carbonates, polyethylene terephthalate, styrene acrylonitrile polystyrene, transparent acrylonitrile butadiene styrene and cellulosics.

8. The transparent article according to claim 7, wherein the transparent polymer matrix comprises a polycarbonate homopolymer.

9. The transparent article according to claim 7, wherein the transparent polymer matrix comprises copolyester carbonate.

10. The transparent article according to claim 7, wherein the transparent polymer matrix consists essentially of a polycarbonate homopolymer and copolyester carbonate.

11. The transparent article according to claim 1, wherein the platelets have an average particle size of greater than 30 microns.

12. A method for making a transparent article which comprises melt extruding a transparent polymer matrix together with an amount of metal oxide-coated glass platelets effective to provide a metallic flake appearance, thereby dispersing the metal oxide-coated glass platelets within a transparent polymer matrix.

13. The method according to claim 12, wherein the transparent polymer matrix comprises a polymer selected from the group consisting of a polycarbonate homopolymer and copolyester carbonate.

14. The method according to claim 13, wherein the melt extrusion is performed under conditions which avoid exposing the platelets to sufficient shear to increase in the yellowness index of the transparent article.

15. The method according to claim 14, wherein the platelets are introduced into molten polymer matrix downstream in an extruder.

16. The method according to claim 15, wherein a concentrate of high platelet content pellets are introduced into an extruder together with an additional matrix material which does not contain the platelets.

17. The method according to claim 16, wherein the matrix of the concentrate pellets differs from the additional matrix material.

18. A transparent article having a metallic flake appearance, wherein said article is prepared by melt extruding a transparent polymer matrix together with an amount of metal oxide-coated glass platelets effective to provide a metallic flake appearance, thereby dispersing the metal oxide-coated glass platelets within a transparent polymer matrix.

* * * * *